June 11, 1946.　　　J. H. HAMMOND, JR　　　2,401,929
DETECTION OF SUBMERGED OBJECTS
Filed May 4, 1942　　　2 Sheets-Sheet 2
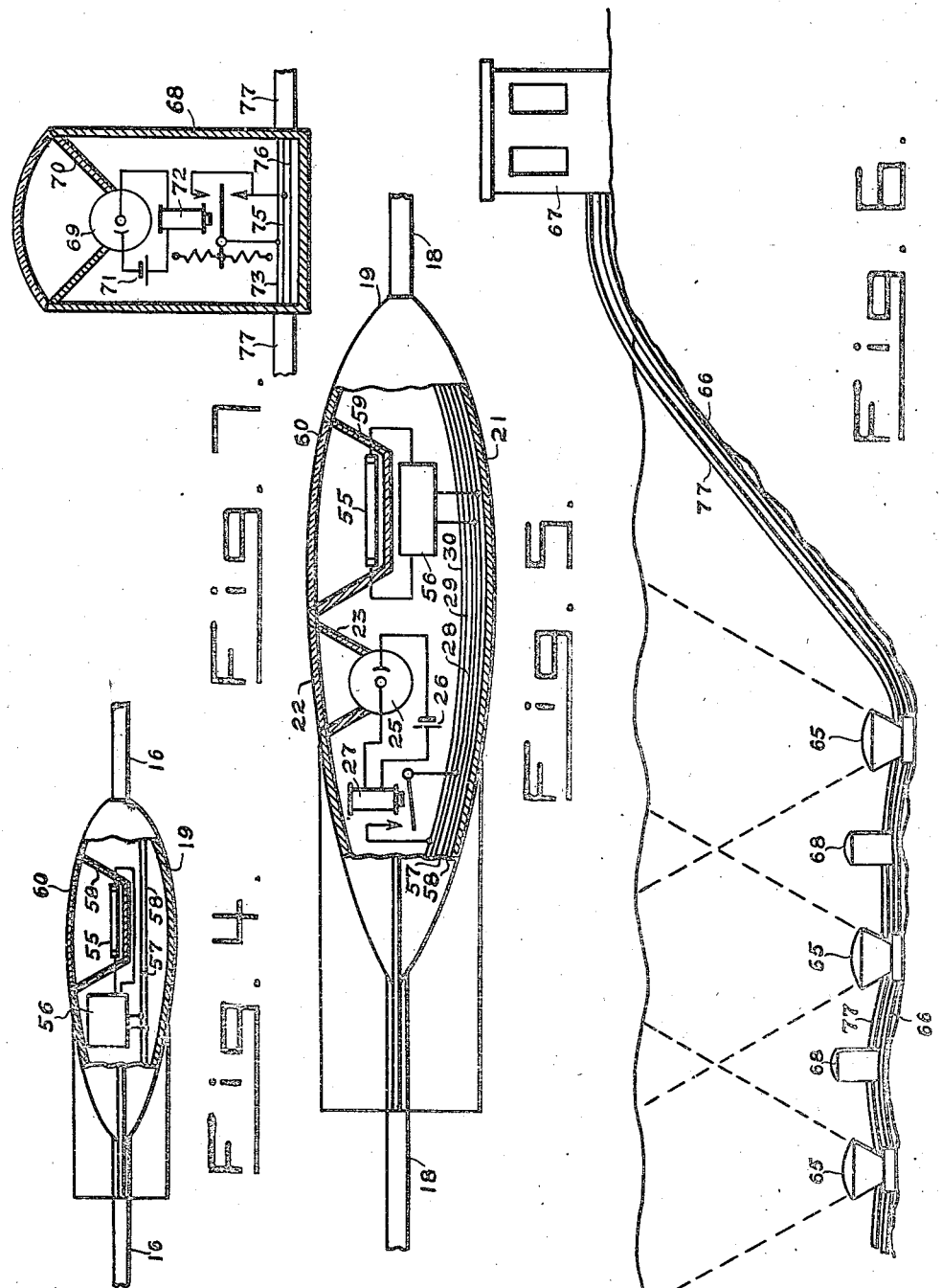
INVENTOR
JOHN HAYS HAMMOND, JR.
BY
ATTORNEY Patented June 11, 1946

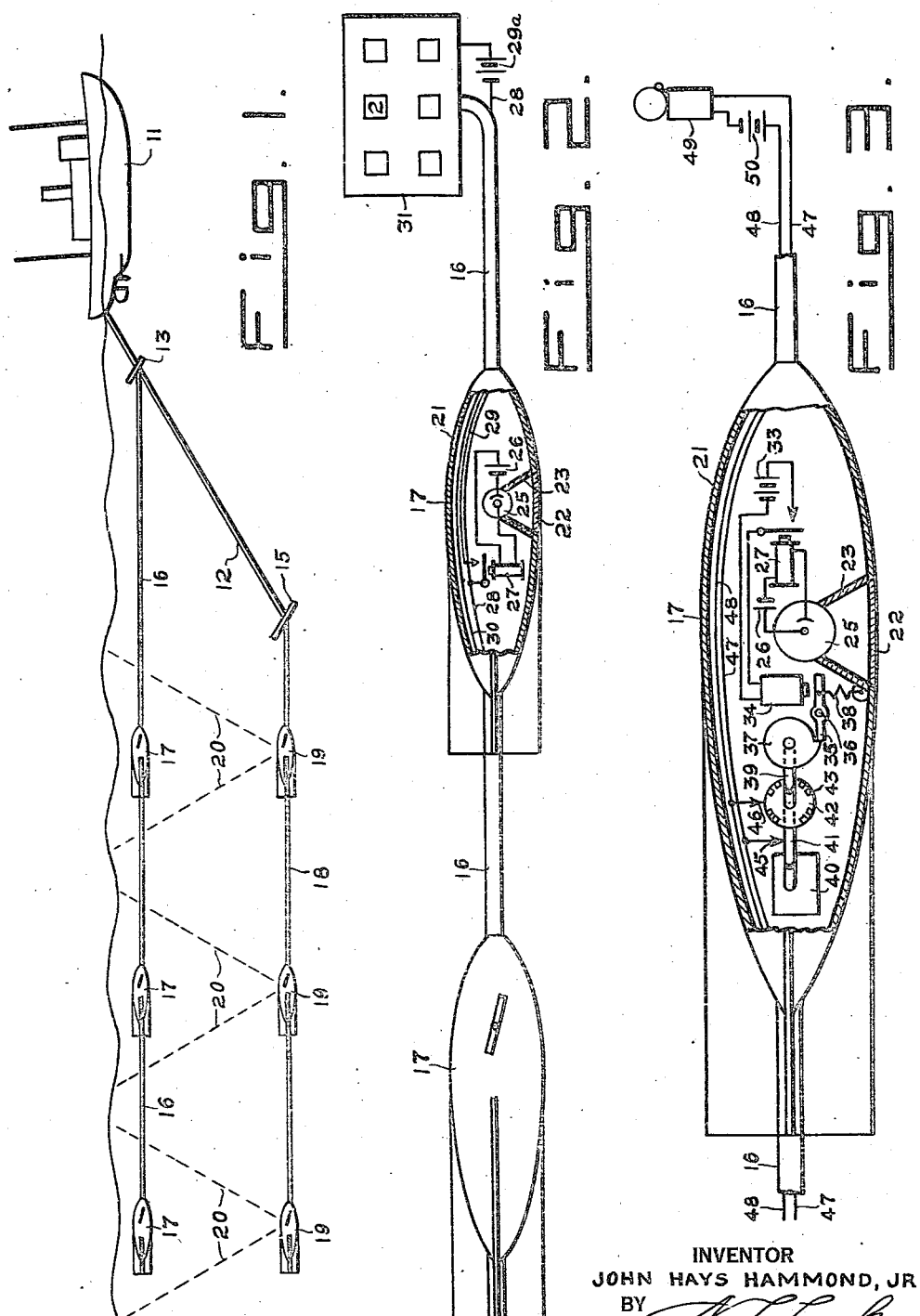

2,401,929

UNITED STATES PATENT OFFICE 2,401,929

DETECTION OF SUBMERGED OBJECTS

John Hays Hammond, Jr., Gloucester, Mass., assignor to Radio Corporation of America, a corporation of Delaware Application May 4, 1942, Serial No. 441,713

3 Claims. (Cl. 177—385)

This invention relates to systems for the detection of submerged objects and more particularly to means for detecting changes in water penetrating rays caused by the presence of a submarine.

More specifically the invention comprises means for projecting rays a considerable depth below the surface of the water and means for registering changes in intensity of such rays caused by the shadow of or by the reflection from a submerged object. The rays may comprise visible or invisible radiations and may be produced by sources located below the surface, either stationary for protecting a harbor or towed behind a vessel for patrol purposes. The rays may be received by receivers located at remote points or at different depths from the sources of radiations and disposed to be influenced by the shadow of the object, or they may be received after reflection, either from the surface of the water or from the object, to be detected, on receivers located adjacent the sources. The receiving means may operate as an indicating device for indicating the position of the submerged object.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, the mode of its operation and the manner of its organization, may be better understood by referring to the following description taken in connection with the accompanying drawings forming a part hereof, in which Figure 1 is a schematic view of the radiations producing and receiving means, together with means for towing same;

Figure 2 illustrates diagrammatically the receiving apparatus together with a position indicator;

Figure 3 illustrates diagrammatically a modified form of receiving apparatus and indicator;

Figure 4 shows an apparatus for producing invisible radiations;

Figure 5 shows an apparatus for producing and receiving invisible radiations;

Figure 6 illustrates diagrammatically a light producing and receiving means which may be permanently located at the bottom of a harbor or channel; and Figure 7 illustrates diagrammatically a modified form of light receiving apparatus.

Like reference characters denote like parts in the several figures of the drawings.

In the following description and in the claims, parts will be identified by specific names for convenience, but they are intended to be as generic in their application to similar parts as the art will permit.

Referring to the accompanying drawings and more particularly to Figure 1, a towing means is shown, such, for example, as a vessel 11 to which is attached a cable 12. Secured to the cable 12 are a small paravane 13 and a large paravane 15 which are adapted to be towed to two different depths, which, for example may be ten and one hundred feet respectively.

Fastened to the smaller paravane 13 is a cable 16 to which are attached at intervals a plurality of radiation receiving bodies 17, known as fish. These may be similar in construction to the fish shown in U. S. Patent 1,625,245 to H. G. Dorsey. Fastened to the larger paravane 15 is a cable 18 to which are attached a plurality of radiation emitting bodies 19, also known as fish. Each of the radiation-producing fish 19 is provided with a source of radiations mounted in the body of the fish and directed upward so as to produce a cone of radiations as indicated by the dotted lines 20. Electrical energy for producing these radiations is generated on the vessel 11 and passes thru conductors provided in the cables 12 and 18. The radiations may comprise light rays, visible or invisible, compressional waves, electromagnetic radiations, or other radiations which are capable of transmission through the water.

The radiation receiving fish 17 are shown in more detail in Figure 2 as applied to receivers for light rays, and comprise, in each case, a shell 21 which is provided with a transparent section 22 above which is mounted a cone shaped reflector 23. At the apex of the reflector 23 is located a photo electric cell 25 which is connected in circuit with a battery 26 and a relay 27. A plurality of conductors 28, 29, 30, etc. are provided in the cables 12 and 16 and are connected to the drops of an annunciator 31, the conductor 28 being connected to a battery 29a which supplies energy for the operation of the system. The conductor 28 is also connected to the armatures of all the relays 27 in the fish 17. Each of the conductors 29, 30, etc. is individually connected to the back contact of each of the relays 27.

The annunciator 31 is located in any convenient position on the vessel 11, such as in the pilot house.

In the operation of the form of the invention shown in Figures 1 and 2, the fish 17 and 19 are towed by the vessel 11 and are maintained at predetermined depths in a well known manner by the action of the paravanes 13 and 15.

Each of the fish 19 produces a cone of radiations 20 which is projected upwards thru the water. The rays from each fish 19 impinge on the photo-cell 25 of the corresponding fish 17 which energizes the relay 27, thus opening the circuit to the corresponding drop in the annunciator 31. The annunciator 31 is then reset in the usual manner. If any of the fish 17 is not receiving radiations or if any of the photo-cells on their circuits is not functioning properly, the corresponding drop will remain down, indicating the location of the trouble.

The apparatus is towed thru the water by the vessel 11. If a submarine should attempt to pass between any cooperating pair of fish 17 and 19, a shadow will be cast on the corresponding fish 17, thus decreasing its illumination of the photo-cell 25. This will cause de-energization of the associated relay 27, which will cause the back contact of this relay to be closed, thus energizing the corresponding drop in the annunciator 31, which will indicate, as by the numeral "2," the location of the submarine.

In this way, it is possible to detect the presence of a submarine at night. The illumination from the fish 19 may be seen by aircraft flying above, so that it would also be possible for an observer in the aircraft to see a submarine passing thru the zone of illumination. If so desired, it is possible for the light from the fish 19 to be directed downward so as to illuminate the sea bottom, when it is not too deep, and thus reveal the presence of a submarine resting on the bottom. This would be especially useful when the bottom is sandy, as the dark hull of a submarine would be conspicuous against the light background of the sand.

*Figure 3*

In the modified form of the invention depicted in Figure 3, the photocell 25 controls the operation of the relay 27 the back contact of which is in circuit with a battery 33 and an electromagnet 34. The armature 35 of the electromagnet 34 is pivoted at 36 and engages the tooth of a ratchet 37 against which it is held by the action of a spring 38. The ratchet 37 is secured to the end of a shaft 39 which is driven by a clockwork mechanism 40 or other suitable drive.

The shaft 39 is provided with a section 41 of conducting material which is insulated from the rest of the shaft and to which is attached a commutator 42 made of insulating material. The commutator 42 is provided with a plurality of conducting segments 43, which are arranged in groups and which are electrically connected to the shaft section 41. Two brushes 45 and 46 are provided which engage the shaft section 41 and the commutator 42, respectively.

The two brushes 45 and 46 are connected to two conductors 47 and 48 which are housed in the towing cable 16 and which run to all the fish 17 and to a bell 49 and battery 50 which may be located in the pilot house of the vessel 11.

In the operation of the modified form of the invention shown in Figure 3, when the photo-cell 25 is illuminated by the light from the fish 19, it will energize the relay 27 which will open the circuit to the electromagnet 34. This will allow the armature 35 to engage the ratchet 37, thus holding the commutator 42 stationary so that the brush 46 will be on the insulation and the circuit to the bell 49 open.

If a submarine should pass between a cooperating pair of fish 19 and 17 so as to cut off the illumination of the photo-cell 25, the relay 27 would be deenergized which, in turn, would energize the electromagnet 34. This will cause the armature 35 to be rotated in a counter-clockwise direction to release the ratchet 37, which will start turning slowly in a counter-clockwise direction under the action of the clockwork mechanism 40. At the same time the commutator 42 will start to turn slowly. As the segments 43 engage the brush 46, the circuit to the bell 49 will be completed causing it to ring.

As the segments 43 are arranged in groups corresponding to the location of the respective fish 17, the bell will give a series of signals corresponding to the fish 17 which is over the submarine. For example, if the submarine is under the second fish 17, a series of two rings will be produced, thus advising the captain of the vessel 11 that a submarine is located beneath the second fish.

After the submarine has passed from beneath the fish 17, the photocell 25 will be again illuminated, which will energize the relay 27 and deenergize the electromagnet 34. The armature 35 will then drop onto the ratchet 37 which will be stopped when the tooth of this ratchet comes around into engagement with the armature 35. The mechanism will then be in its inoperative position and the bell will stop ringing.

*Figure 4*

In the modified form of the invention shown in Figure 4, the fish 19 is provided with a source of invisible radiation 55 which may be a vapor discharge lamp of the H-6 quartz type which produces over 50 percent of its ultra-violet energy in the spectral range $\lambda3165$–$\lambda4000$. It has been found that the penetration of ultra violet light thru sea water is greatest in the range from about $\lambda3100$–$\lambda4000$ (article on "Penetration of ultra violet light thru water," by E. O. Hulburt, Journal of the Optical Society of America, vol. 17, No. 1, July 1928).

The lamp 55 is connected to the output side of a transformer 56 the input side of which is connected to the power supply lines 57 and 58 which are contained in the cable 16 and which are supplied with suitable energy from the vessel 11. The lamp 55 may be mounted in a suitable reflector 59 made of aluminum or other material having good reflecting properties for ultra violet light.

The lamp 55 may be covered by a sheet of material 60 which is transparent to ultra violet light, such, for example, as quartz or some suitable plastic.

When this type of ultra violet light producing fish 19 is employed, the photo-electric cell 25 in the light receiving fish 17 should be of a type which is especially suitable for receiving ultra violet light of the type emitted by the lamp 55, such, for example, as the sodium, potassium or caesium photo-electric cells, which have their greatest sensitivity in the $\lambda3,000$–$\lambda4,000$ region of the ultra violet spectrum.

The operation of the device shown in Figure 4 is similar to that described in connection with Figures 1 and 2 except that in this instance the light employed is in the invisible region of the spectrum, so that it cannot be observed by the enemy and is thus not so apt to be avoided by them.

Figure 5

In the modified form of the invention shown in Figure 5, the fish 19 is shown as containing both the lamp 55 for producing ultra violet radiation and the photo-electric cell 25 for receiving this radiation after it has been reflected from a submarine or other object. In this case, all the conductors 28, 29, 30, 57 and 58 are contained in the cable 18 and are connected, in a manner similar to that already described, to the contacts of the relays 27 and to the transformers 56.

In the operation of the modified form of the invention shown in Figure 5, the relay 27 is adjusted so that under normal conditions with only the light reflected and scattered by the sea water impinging on the photo electric cell 25, the contacts will be open. If a submarine or other vessel passes above the fish 19, a certain amount of ultra violet light from the lamp 55 will be reflected from the vessel and will be received by the photo-electric cell 25, thus energizing this cell and causing the operation of the relay 27 which, in turn, will operate the indicating device on the vessel 11. In this way, only one set of fish will be necessary, thus simplifying the towing problem. If found desirable, a source of visible light could replace the lamp 55 and a photo-electric cell 25 sensitive to visible light could be employed.

Figures 6 and 7

In Figures 6 and 7 is shown a stationary system for detecting the presence of a submarine or other vessel. In this form of the invention a plurality of sources of illumination 65 are located on the bottom of a harbor or a channel and are connected by a power cable 66 to a suitable source of energy located in a building 67. The sources of illumination 65 may produce ultra violet or visible light as desired. Located adjacent to the sources of illumination 65 are a plurality of light receivers 68 in which are mounted photo-electric cells 69 (Figure 7) and reflectors 70. The photo-electric cells 69 are connected thru batteries 71 to the windings of balanced relays 72. The armatures of all the relays 72 are connected to a common conductor 73 and the contacts of each of the relays 72 are connected to separate conductors 75, 76, etc. All these conductors are contained in a cable 77 and are connected to an annunciator (not shown) located in the building 67 and which may be similar in construction to the annunciator 31 depicted in Figure 2.

In the operation of the modified form of the invention shown in Figures 6 and 7, the relay 72 is adjusted so that, under normal conditions, the armature will be in a central position and the contacts open. If a submarine or other vessel should pass above one of the light receivers 68, a certain amount of light will be reflected to the photo-electric cell 69 to increase the energization of the relay 72, which will close the upper contact and operate the annunciator in the building 67.

A submarine might pass in such a way that the normal amount of light received by the photo-electric cell 69 will be decreased, which will decrease the energization of the relay 72, thus closing the lower contact and causing the annunciator in the building 67 to operate.

Although only a few of the various forms in which this invention may be embodied have been shown herein, it is to be understood that the invention is not limited thereto but may be embodied in various forms within the scope of the appended claims.

What is claimed is:

1. A system for detecting the presence of a submerged object comprising a plurality of submerged sources of water penetrating rays spaced from each other in a horizontal direction, a plurality of submerged receivers correspondingly spaced from each other in a horizontal direction and positioned to receive said rays after passage through the water, means for maintaining said sources and said receivers in superposed and vertically spaced, cooperative relation to each other whereby said object may be received therebetween at an intermediate elevation, said receivers being responsive to variations in intensity of the received waves, and mechanism actuated by said respective receivers in response to variations in intensity of the received waves produced by the presence of said object in the path of said rays for indicating the actuating receiver.

2. A system according to claim 1 in which towing means is provided to tow said sources and said receivers through the water in the area to be patrolled.

3. A system according to claim 1 in which towing means is provided to tow said sources and said receivers through the water in the area to be patrolled, said towing means including a pair of cables to one of which said sources are connected and to the other of which said receivers are connected, and a paravane on each of said cables so located thereon as to maintain each of said cables at a different elevation in the water while being towed.

JOHN HAYS HAMMOND, Jr.